(12) United States Patent
Watanabe

(10) Patent No.: US 7,037,197 B2
(45) Date of Patent: May 2, 2006

(54) GAME SOFTWARE AND GAME MACHINE

(75) Inventor: Tsutomu Watanabe, Tokyo (JP)

(73) Assignee: Konami Corporation, Tokyo (JP)

( * ) Notice: Subject to any disclaimer, the term of this patent is extended or adjusted under 35 U.S.C. 154(b) by 0 days.

(21) Appl. No.: 10/673,622

(22) Filed: Sep. 29, 2003

(65) Prior Publication Data

US 2004/0077405 A1   Apr. 22, 2004

(30) Foreign Application Priority Data

Oct. 22, 2002   (JP) .......................................... 2002-307410

(51) Int. Cl.
  *A63F 13/00*   (2006.01)

(52) U.S. Cl. .......................................... 463/30; 463/43

(58) Field of Classification Search ............. 463/30–38, 463/43–44
  See application file for complete search history.

(56) References Cited

U.S. PATENT DOCUMENTS 6,102,801 A * 8/2000 Sugawara .................... 463/31

FOREIGN PATENT DOCUMENTS

| JP | H11-347250 | | 6/1998 |
|---|---|---|---|
| JP | 11-347250 | * | 12/1999 |
| JP | P2000-210471 | | 8/2000 |
| JP | P2002-166052 A | | 6/2002 |
| JP | P2002-253848 A | | 9/2002 |
| JP | 2002-253848 | * | 9/2002 |

OTHER PUBLICATIONS

European Search Report EP Application EP 03 02 0932, Nov. 12, 2003, Munich Germany.
Anon: "winback: Covert Operations", Web.Archive.Org. [Online], Feb. 8, 2001, XP002261534.
Anon: "destroyer command", www.sh2fleet.com, [Online], Feb. 28, 2001, XP00222261535.

* cited by examiner

*Primary Examiner*—Kim Nguyen
(74) *Attorney, Agent, or Firm*—Duane Morris LLP

(57) ABSTRACT

A process for controlling sound producing produces predetermined sound according to a distance between a position for obtaining an invisible item and an operation character, to be computed by process for computing item distance, and outputs from sound output means. A process for obtaining invisible item executes a processing for obtaining invisible item for a corresponding operation character in such a state that the distance becomes a predetermined value or lower. Then, the perception of a player through hearing sense concerning acquisition of an item can be introduced as an element of the game. So, the player can search the item with assistance of predetermined sound produced, thereby increasing a fun of the game.

4 Claims, 4 Drawing Sheets

GAME SOFTWARE AND GAME MACHINE

BACKGROUND OF THE INVENTION

This invention relates to game software through which a character to be operated by a player obtains an item in a game so that the game can proceed. Specifically, the invention relates to game software in which an essential element in the game is sound concerning acquisition of the item.

Various kinds of sound is generally made during a game in such kind of the game software. Sound to be used in a game are voice concerning contents of proceeding of a game and voice spoken by a character, and BGM (background music) and effective sound, and the like. These kinds of sound can increase reality of a game or give a player information excluding visual sense. For instance, predetermined sound is made when obtaining an item by a character, so that a player can perceive the acquisition of the item through hearing sense in addition to visual sense.

But, these kinds of sound, such as BGM and effective sound, only exhibit representation effect or only play a subsidiary role concerning visual sense in the above-mentioned game software, and are not always necessary elements in the process of a game. That is, the perception through hearing sense by a player does not sufficiently increase a fun of a game. Under these circumstances, such demand that perception through hearing sense in addition to visual sense should be also added to the element of a game in such game software in order to increase the fun of the game is increasing.

Then, game software for adopting sound concerning acquisition of an item as an indispensable element in the process of a game, thereby increasing the fun of the game, has been desired.

SUMMARY OF THE INVENTION

The present invention can be formed as game software being a program for getting a computer to execute the following processes, comprising:
- a process for producing virtual game space, for producing virtual game space where an operation character can move with an operation of a controller connected with said computer;
- a process for setting invisible item, for setting a position for obtaining an invisible item which can be obtained by said operation character in said virtual game space;
- a process for computing item distance, for computing a distance in said virtual game space between said operation character and said invisible item set at said position for obtaining ($P_B$, for instance);
- a process for controlling sound producing, for producing predetermined sound (SE, for instance) according to a distance computed by said process for computing item distance, and outputting from sound output means (7, for instance) connected with said computer; and
- a process for executing processing for obtaining invisible item, for executing processing for obtaining said invisible item for said operation character in such a state said distance computed by said process for computing item distance becomes a predetermined value or lower.

This invention is to be construed as including or not including the program for getting a computer to execute a display process for displaying at least a part of the visual game space produced by the process for producing virtual game space on the display together with the operation character. That is, such game software may be possible that the invisible item is to be obtained with the assistance of only sound without displaying a character or a background image on the display.

According this invention, the process for controlling sound producing produces predetermined sound (SE, for instance) according to the distance between the position for obtaining the invisible item ($P_B$, for instance) and the operation character and the sound is outputted from the sound output means (7, for instance). Then, the perception of a player through hearing sense concerning the acquisition of the item can be adopted as indispensable element of the game, and then, the player can search the item with an assistance of the produced sound, thereby increasing the fun of the game.

And, an another aspect of the invention is the game software, wherein said process for controlling sound producing changes a style (ST, for instance) of outputting sound outputted from said sound output means (7, for instance) according to said distance computed by said process for computing item distance.

According to this aspect, the style (ST, for instance) of output of sound to be outputted is changed according to the distance computed by the process for computing item distance, so that the player can search the invisible item, corresponding to the change of the output style so as to increase the fun of the game. The player can receive such sense as if the sound was made from the position for obtaining ($P_B$, for instance) when changing the strength of sound (ST) as output style so as to become gradually bigger as the above-mentioned distance becomes shorter, thereby further increasing the reality of the game.

Besides, an another aspect of the invention is the game software, wherein said process for setting invisible item controls to move said position for obtaining ($P_B$, for instance) in said virtual game space.

According to this aspect, the player searches the item moving around within the virtual game space, thereby increasing the difficulty of obtaining the item so as to give the player a motivation for obtaining the item.

Besides, the invention may be formed as a game machine, comprising:
- means for producing virtual game space, for producing virtual game space where an operation character can move with an operation of a controller connected with said game machine;
- means for setting invisible item, for setting a position for obtaining an invisible item which can be obtained by said operation character in said virtual game space;
- means for computing item distance, for computing a distance in said virtual game space between said operation character and said invisible item set at said position for obtaining;
- means for controlling sound producing, for producing predetermined sound (SE, for instance) according to a distance computed by said means for computing item distance, and outputting from sound output means (7, for instance) connected with said game machine; and
- means for executing processing for obtaining invisible item, for executing processing for obtaining said invisible item for said operation character in such a state said distance computed by said means for computing item distance becomes a predetermined value or lower.

DESCRIPTION OF THE PREFERRED EMBODIMENTS

Figure 1:
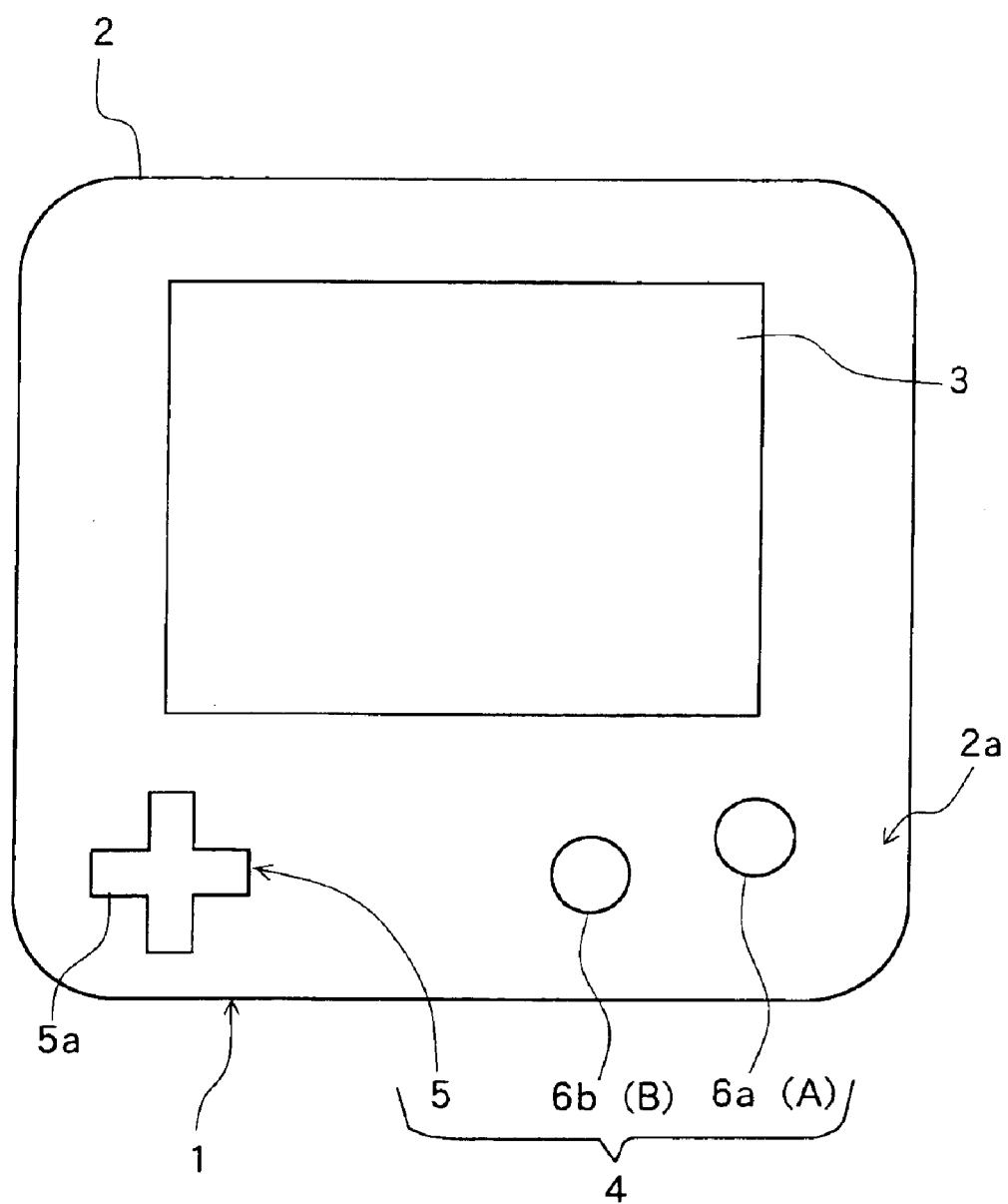
FIG. 1 is a sketch drawing showing an instance of a portable game machine to which the invention is applied.

FIG. 1 shows a portable game machine as a computer comprising a game system. A portable game machine 1 has a main body 2, a reflective liquid crystal display 3 attached to the main body 2 as a display unit, and an input device 4. The input device 4 has a direction key 5 and a plurality of push button switches 6a, 6b which are provided on an operation portion 2a located at the lower portion of the main body 2. The direction key 5 has a cross type of operation member 5a, for instance, and outputs a signal corresponding to each operation in up and down directions and in right and left directions of the operation member 5a (the operation of pushing down the end portion of the upper portion, the lower portion, the right portion or the left portion of the operation member).

The operation portion 2a having various kinds of operation members, such as the direction key 5, and the push button switches 6a, 6b of the input device 4, is not always integral with the display 3, and the display 3 may be provided, being separate from the operation portion 2a.

A structure of such input device 4 is well-known, so various transformations are possible. For instance, four push buttons may be respectively located in upper and lower hands and in right and left hands, in place of the operation member 5a. The number of the push button switches 6a, 6b and their location may be changed in various forms. If it is not necessary to differentiate both push buttons 6a, 6b from each other, it is referred to as a button 6 in the following descriptions. And, the game machine 1 is provided with a power switch, an operation member for adjusting sound volume and the like, but these are omitted.

Figure 2:
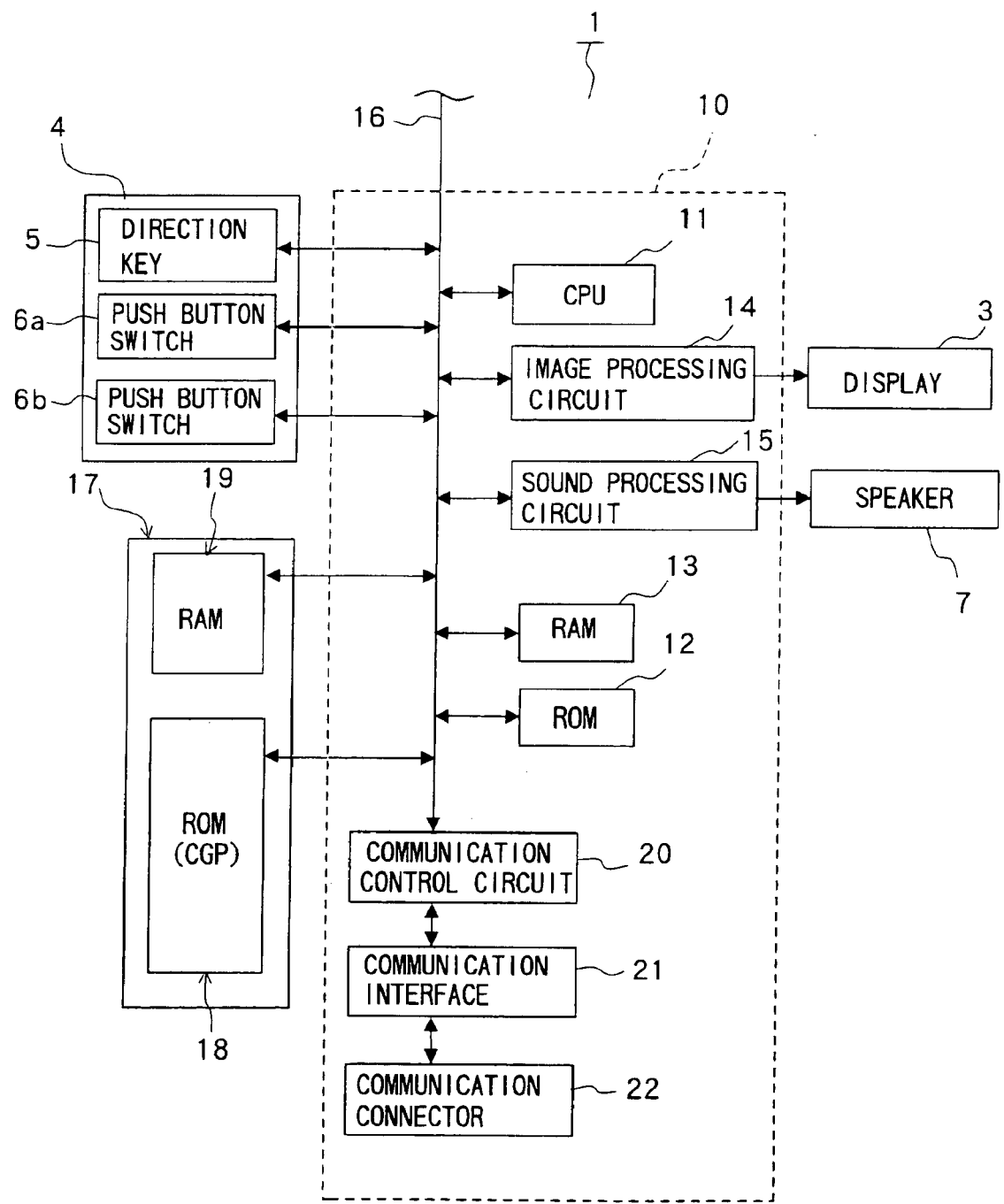
FIG. 2 is a control block diagram of the game machine of FIG. 1.

FIG. 2 shows a structure of a control unit 10 provided at the game machine 1. The control unit 10 is a computer making use of a microprocessor, main body of which is a CPU (central processing unit) 11. A ROM 12 (read only memory) and a RAM 13 (random access memory) as main memories, an image processing circuit 14 and a sound processing circuit 15 are respectively connected with the CPU 11 through a bus 16.

A program necessary for basic control of the game machine 1 (booting processing, for instance) is stored in the ROM 12. A work area with respect to the CPU 11 is secured in the RAM 13. The image processing circuit 14 controls the liquid crystal display 3 according to a picturing instruction from the CPU 11 so as to display a predetermined image on its picture.

The sound processing circuit 15 has PCM (pulse code modulation) sound source, and converts sampling data coded by a predetermined sampling frequency, such as effective sound and music, into an analog signal according to a pronouncing instruction from the CPU 11 so as to output to a speaker 7.

The direction key 5 and the push button switch 6 of the input device 4 are connected with the CPU 11 through the bus 16, and the CPU 11 can thereby judge the state of operation of the direction key 5 and the push button switch 6. Besides, an external memory 17, which is an object different from the control unit 10, is connected with the bus 16.

The external memory 17 is comprised of a cartridge detachably attaching to the main body 2, for instance, and a ROM (read-only memory) 18 as memory medium and a RAM 19 (random-access memory) as a reloadable user memory are provided therein. A game software CGP for working the game machine 1 as a computer is stored in the ROM 18 in advance. The reloadable ROM, such as a flash memory, is used as the memory 19, and save data of a game, for instance, are stored in the memory according to necessity.

Various storage mediums, such as a magnetic storage medium, an optical storage medium and a photoelectric magnetic storage medium, may be used as the storage medium of the external memory 17, in addition to a semiconductor storage element. Besides, the game software CGP may be supplied through a network, such as the Internet, without using the above-mentioned storage mediums. An interface circuit intervenes between the bus 16 and each element, if necessary, but this is not shown. Various kinds of control units 10 may be used without limiting to the above-mentioned structure.

A communication control circuit 20 is connected with the CPU 11 through the bus 16 in order to connect the game machine 1 with a predetermined communication line, an another game machine or the like. A communication connector 22 is connected with the communication control circuit 20 through a communication interface 21. As the communication control circuit 20, one functioning as a modem or a network interface by combining a DSP (digital signal processor) and software with each other, for instance, may be utilized. The communication connector 22 and/or the interface 21 may be provided as a peripheral equipment to be connected with the game machine 1 outside.

Figure 3:
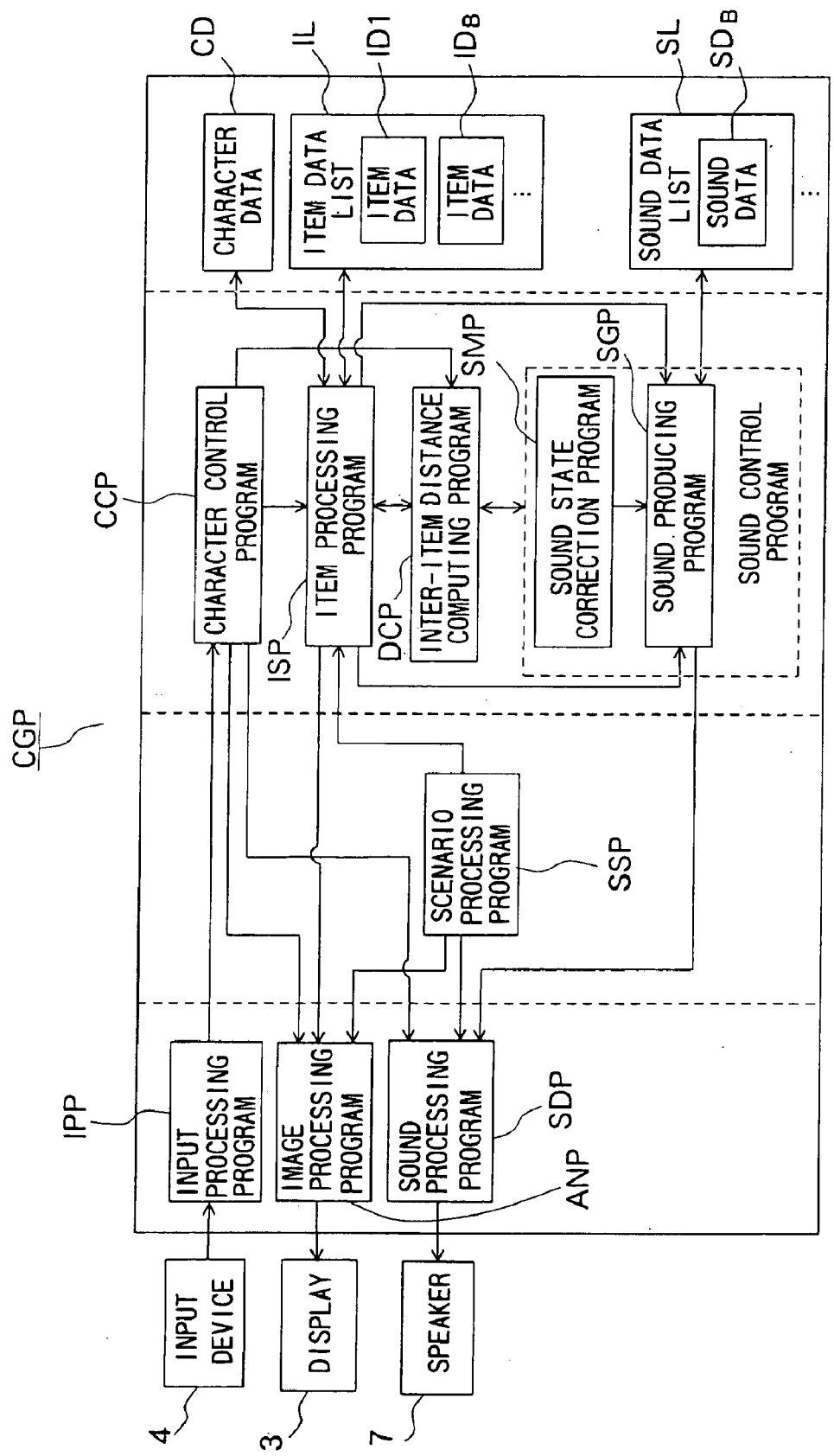
FIG. 3 is a block diagram showing an instance of game software according to the invention.

FIG. 3 shows a structure of the game software CGP according to the invention. As shown in FIG. 3, the game software CGP has a hierarchical structure modularized with a plurality of programs so that the game machine 1 can function.

At an inferior hierarchy on the left hand in the figure, programs for processing user interface, such as an input processing program IPP, an image processing program ANP, and a sound processing program SDP, are registered. And, at a superior hierarchy in almost central portion in the figure, a scenario processing program SSP for advancing a game on the basis of a scenario is registered. And, at more superior hierarchy on the right hand of the figure, programs for controlling so as to execute various kinds of tasks necessary for game proceeding, such as a character control program CCP, an item processing program ISP, an inter-item distance computing program DCP, a sound control program (in a frame with a broken line), are registered. Furthermore, the sound control program is comprised of a sound state correction program SMP and a sound producing program SGP.

Character data CD comprised of data concerning a character, such as attribute of a character and an obtained item, an item data list IL having data concerning items to be used in a game, and a sound data list SL having data concerning sound, such as effective sound and music, are registered in advance in a data area in the superior hierarchy as shown on the right hand in the figure. And, item data ID1, $ID_B$, . . . , such as data showing kind, name and contents of each item, an item appearance position coordinate, are registered in the item data list IL. Various kinds of sound data $SD_B$, . . . are registered in the sound data list SL.

A plurality of tasks produced on the basis of the respective programs CCP, ISP, . . . are executed in order by Multitasking according to a multitasking operation system (Multitasking OS) (not shown) in accordance with its priority order. Only programs necessary for explaining the invention are shown in the above-mentioned hierarchical structure as a simplified one. But, the actual hierarchical structure is more complex, and includes various kinds of programs, such as parallel processing program. An arrow for showing an instruction or delivery of data is shown between both programs. But, the arrow is shown in order to easily understand the invention, so the arrow does not limit the method of processing the program or the method of dealing with data.

After a predetermined initializing operation (such as the operation of power on) in the game machine 1 having the above-mentioned structure, the CPU 11 firstly executes a predetermined initialization processing according to a program of the ROM 12. After finishing the initialization, the CPU 11 reads the respective programs and the respective data of the game software CGP, which are recorded in the ROM 18 of the external memory 17, so as to store in the RAM 13. On the basis of the scenario processing program SSP as shown in FIG. 3 in the game software CGP which is stored in the RAM 13, the CPU 11 starts a game according to a scenario shown by the scenario processing program SSP.

After starting the game, the image processing program ANP as shown in FIG. 3 accesses through the CPU 11 image data of a character operable by a player from a character table (not shown) registering various kinds of image data in advance therein, the character table being stored in the data area of the RAM 13 as shown in FIG. 2.

Figure 4:
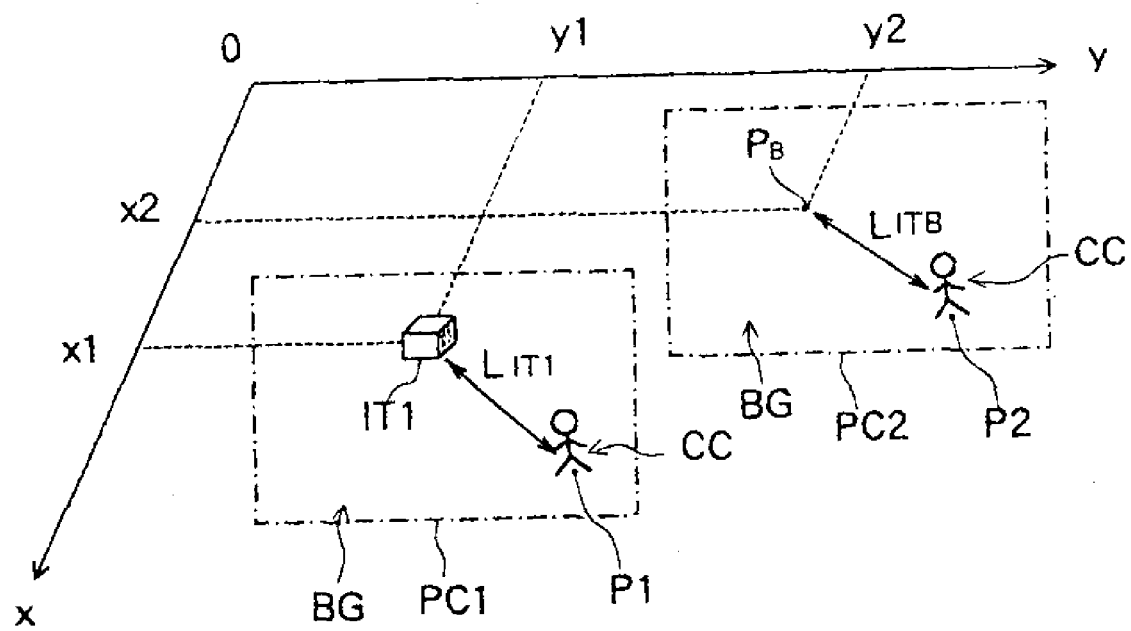
FIG. 4 is a view showing an instance of a game space through which processing for obtaining a transparent item is explained.

FIG. 4 shows an instance of a game space. The image processing program ANP produces a sprite picture showing a character CC thereon on the basis of the above-mentioned image data through the CPU 11, and displays the image locating the character CC thereon made by locating the sprite picture on a background picture BG on the display 3 through the image processing circuit 14, as shown in FIG. 4. Various kinds of graphic corresponding to a kind of the game or a scenario (such as a picture with buildings and streets) are represented on the background picture BG, but the background picture BG is omitted for convenience of explanation of the embodiment.

When a player presses the direction key 5 of the input device 4 in a predetermined direction so as to input a predetermined signal for actuating the character CC, the input processing program IPP as shown in FIG. 3 processes this predetermined signal as an operation signal through the CPU 11. The CPU 11 produces a sprite picture showing various kinds of operations of the character CC (for instance, walking forward operation in a predetermined direction) according to the operation signal on the basis of the character control program CCP as shown in FIG. 3, and controls to move the sprite picture on a game coordinate which is set on the display 3 through the image processing circuit 14.

The game space is set as a virtual two-dimensional space with a x-axis coordinate and a y-axis coordinate which are orthogonal with each other (a world coordinate), as shown in FIG. 4, and the character CC moves a predetermined distance when pushing the direction key 5 in any direction of the four directions, up, down, right and left, once.

Then, the CPU 11 controls to move the sprite picture of the character CC a predetermined distance in the virtual two-dimensional space according to the operation of pressing the direction key 5 down in a predetermined direction on the basis of the character control program CCP. Furthermore, the CPU 11 replays and displays a corresponding moving motion of the character CC on the display 3, corresponding to a screen coordinate (a x-y coordinate where a left upper end of the display 3 is an origin) with the image processing program ANP. When the player repeatedly presses the direction key 5 down in each direction, the various kinds of operations of the character CC, such as the operation as if the character CC walked in a town shown as the background picture BG, are represented on the display 2.

The game software CGP prepares various kinds of items, and an opportunity of obtaining an item IT is given to the player according to the scenario.

The "item IT" appears as the item to be obtained by the player during the game. When obtaining the item IT by the player, the game can be developed in a state advantageous for the player (for instance, equipment is strengthened or the game proceeds to the next stage) or the player can gain special favor in the game (display chance of a predetermined picture, for instance), so that the game proceeding can be brought to a good condition. And, it is not necessary that acquisition of item always makes the game proceeding good state, but it may be only collection by the player.

When the player operates through the input device 4 so as to locate the character CC on a position P1 on the game coordinate as shown in FIG. 4, the image processing program ANP displays an image PC1 enclosed by a dashed line of FIG. 4 on the display 3 through the CPU 11 and the image processing circuit 14. Then, the CPU 11 judges to start item processing according to the position P1 where the character CC is located on the basis of development of the scenario with the scenario processing program SSP, and starts the item processing with the item processing program ISP as shown in FIG. 3.

The item processing program ISP accesses the item data ID1, for instance, through the CPU 11 in accordance with the above-mentioned item processing from the item data list IL (see FIG. 3) which is stored in the data area of the RAM 13 as shown in FIG. 2, and outputs a picturing instruction corresponding to the item data ID1 to the image processing circuit 14 through the image processing program ANP.

Receiving such an instruction, the CPU 11 accesses the image data corresponding to the item data ID1 from the item data list IL on the basis of the image processing program ANP, and produces the sprite picture showing an item IT1 with the image data. And then, the item IT1 is displayed on the display 3, located on a coordinate (x1, y1) so as to correspond to an item appearing position coordinate (world coordinate) as shown in the item data ID1 concerning the item by the image processing circuit 14 as shown in FIG. 4.

Watching the displayed item IT1, the player inputs a predetermined signal by pressing down the direction key 5 so that the character CC can approach the item IT1 in order to obtain the item IT1. Then, the CPU 11 produces the sprite picture of the character on the basis of the character control program CCP, and controls to move the character a predetermined distance for the item IT1 in the virtual two-dimensional space. At the same time, the CPU 11 replays and displays the moving motion when the character CC approaches the item IT1 on the display 3 with the image processing program ANP.

The CPU 11 computes a distance on the x-y coordinate between an appearance position of the item IT1 and the character CC ("inter-item distance $L_{IT1}$" hereinafter) on the basis of the inter-item distance computing program DCP as shown in FIG. 3 whenever controlling the movement of the sprite picture of the character CC after the start of the item processing. The item processing program ISP always watches as to whether the computed inter-item distance $L_{IT1}$ is a predetermined value or lower, that is, whether or not the character CC approaches the item IT1 within a predetermined distance, through the CPU 11 in order to judge as to whether or not the processing for obtaining the item IT1 for the character CC is executed.

When the player pushes down the push button 6 for outputting the instruction of obtaining the item in such a state that the player presses down the direction key 5 so that the character CC can approach the item IT1, and the CPU 11 judges with the item processing program ISP that the inter-item distance $L_{IT1}$ is a predetermined value or lower, the CPU 11 executes the processing of obtaining the item IT1 on the character CC on the basis of the item processing program ISP. In an another method, the processing of obtaining the item IT1 may be automatically executed irrespective of the pressing down operation of the push button 6 when judging that the inter-item distance $L_{IT1}$ becomes a predetermined value or lower.

The important point of the present invention is that a subject for obtaining the item is sound as mentioned hereinafter, so the present invention can be also applied to the game machine or the computer for executing this software having no graphic machine or a monitor.

The CPU 11 writes predetermined data showing the item IT1 is obtained on the basis of the item data ID1 in the character data CD (see FIG. 3) on the basis of the item processing program ISP so as to execute the processing for relating the item IT1 with the character CC. The character data CD are stored in the data area of the RAM 13 as shown in FIG. 2 and correspond to the character CC, but the character data CD do not always correspond to one person of character CC, but may correspond to a group of characters including this character CC. By this processing of obtaining the item, in the subsequent game, the player can bring the game to an advantageous development according to the obtained item IT1 or can bring the game to a good state by obtaining a special favor in the game. And, the game proceeds by further obtaining an another item by the player.

The game proceeds in this way. When the character CC is controlled to be moved to a position P2 on the game coordinate as shown in FIG. 4 by the operation by the player through the input device 4, an image is scrolled with the image processing program ANP so as to display an image PC2 as shown in FIG. 4 (enclosed by the dashed line) on the display 3.

The invisible items to be utilized in the present invention are the item having an existence position on the world coordinate or attribute of effect and no image information, the item having image information, the image being processed so as to be transparent, and the item having image information which has color information the same as a background image. That is, the invisible item has a substance as an object, but has no discrimination at a picture stage between the object and the other objects. The transparent item $IT_B$ set in the game software CCP of this embodiment is the item having only attributes of effect, such as melody and voice, but no image information, for instance. Then, the player is to collect the transparent item $IT_B$ according to the development of a scenario. Then, let us suppose that the CPU 11 outputs a start instruction of the item processing concerning the transparent item $IT_B$ together with the movement of the character on the basis of the scenario processing program SSP.

The transparent item $IT_B$ is the item to be obtained by the player during the game, similar to the item IT1, as already mentioned before, but the transparent item $IT_B$ is set so as not to display on the display 3 as an image, different from the above-mentioned item IT1, that is, so as not to perceive with eyes for the player. On the contrary, the transparent item $IT_B$ is represented by outputting sound, such as melody and voice as if the sound was outputted from an appearance position of the transparent item $IT_B$. That is, the game software CGP according to the invention has the item $IT_B$ which can not be perceived by the player through visual sense as the item which can be searched with hearing sense (the details are mentioned hereinafter).

On the basis of a start instruction of the item processing, the item processing program ISP starts item processing for the transparent item $IT_B$ through the CPU 11. The item processing program ISP firstly accesses the item data $ID_B$ corresponding to this instruction from the item data list IL (see FIG. 3) which is stored in the data area of the RAM 13 as shown in FIG. 2 through the CPU 11. When the item data $ID_B$ is accessed, the item processing program ISP outputs an execution instruction of sound control through the sound processing circuit 15.

The sound producing program SGP accesses the sound data $SD_B$ corresponding to the item data $ID_B$ from the sound data list SL (see FIG. 3) which is stored in the data area of the RAM 13 as shown in FIG. 2 through the sound processing circuit 15, and produces sampling data to be converted, and outputs a start instruction of sound processing. Receiving this instruction, the sound processing program SDP of FIG. 3 converts the sampling data into an analogue signal through the sound processing circuit 15, and outputs specific effective sound SE corresponding to the item data $ID_B$, for instance, through the speaker 7.

The player already knows that the item $IT_B$, which can be searched with hearing sense, is set in the game software CGP, and can perceive an occasion for obtaining the transparent item $IT_B$ when outputting the specific effective sound SE from the speaker 7, corresponding to the movement of the character CC on the game coordinate. But, it is not necessary to always know for the player that the transparent item $IT_B$ is set in the game software CGP. So, the transparent item $IT_B$ may be the item, of which the game does not inform the player (so-called "hidden item").

When the player perceives the occasion for obtaining the transparent item $IT_B$ in this way, the player presses down the direction key 5 so as to input a predetermined signal for moving the character CC in order to obtain the transparent item $IT_B$. When the character CC moves on the background picture BG, the sound state correction program SMP of FIG. 3 executes through the CPU 11 correction processing of the state of the effective sound SE being outputted on the basis of the coordinate on which the character CC is located according to this movement.

Similar to the above-mentioned, the inter-item distance computing program DCP computes the distance between the items whenever the sprite picture of the character CC is controlled to be moved after start of the item processing for the transparent item $IT_B$ through the CPU 11. That is, this program computes the distance between an appearance position $P_B$ of the transparent item $IT_B$ (an coordinate (x2, y2) as shown in FIG. 4) and the character CC on the x-y coordinate (referred to as the "inter-item distance $L_{ITB}$" hereinafter) on the basis of the coordinate of the item appearance position (the world coordinate) which is shown in the item data $ID_B$.

Then, the sound state correction program SMP detects through the CPU 11 the inter-item distance $L_{ITB}$ computed by the inter-item distance computing program DCP and corrects the state of the outputted effective sound SE on the basis of the inter-item distance $L_{ITB}$.

Concretely speaking, the sound state correction program SMP corrects through the CPU 11 the height of the wave form of the data into bigger one so as to make strength of sound ST (db: decibel) of the effective sound SE bigger as the inter-item distance $L_{ITB}$ becomes shorter (that is, as the character CC approaches the appearance position $P_B$ of the transparent item $IT_B$) with the standard of the height of the wave form of sampling data produced. On the contrary, the height of the wave form is corrected into smaller one so as to make strength of sound ST smaller (so as to make the strength of sound ST zero when the inter-item distance $L_{ITB}$ becomes a predetermined value or more) as the inter-item distance $L_{ITB}$ becomes longer (that is, as the character CC keeps away from the appearance position $P_B$ of the transparent item $IT_B$).

For instance, the player inputs a predetermined signal by pressing the direction key 5 so that the character CC can approach the appearance position $P_B$ of the transparent item $IT_B$. When the character CC approaches the appearance position $P_B$ of the transparent item $IT_B$, the inter-item distance $L_{ITB}$ computed by the inter-item distance computing program DCP becomes smaller, and the sound state correction program SMP corrects the sampling data produced through the CPU 11 so that its height of the wave form becomes bigger on the basis of the inter-item distance $L_{ITB}$ which was made smaller.

Then, the sound producing program SGP outputs the corrected sampling data in order through the CPU 11. Receiving this output, the sound processing program SDP converts the data into analogue signals in order through the CPU 11 and the sound processing circuit 15, so that the effective sound SE, sound strength ST of which is corrected so as to be bigger, is outputted from the speaker 7. When the player operates the character CC so as to further approach the appearance position $P_B$ of the transparent item $IT_B$, the strength of sound ST further becomes bigger.

When the player operates the character CC to keep away from the appearance position $P_B$ of the transparent item $IT_B$ by pressing down the direction key 5, the sampling data is corrected so that the height of the wave form can become smaller (no sound state including "zero") with the sound state correction program SMP, and the effective sound SE, strength of sound ST of which is corrected to be smaller, is outputted from the speaker 7.

As the result, the player feels that the character CC approaches or keeps away from the item $IT_B$, and perceives as if a coordinate of appearance position of the transparent item $IT_B$ (x2, y2) made the effective sound SE. Then, the player operates the character CC with the assistance of the effective sound SE, the strength of sound ST of which increases or decreases so that the character CC can approach the appearance position $P_B$ of the transparent item $IT_B$, that is, so that the strength of sound ST of the effective sound SE can be made bigger, thereby searching the transparent item $IT_B$.

It is not necessary to always fix the transparent item $IT_B$ at the coordinate of the appearance position (x2, y2), but the item $IT_B$ may be automatically moved on a computer side with the item processing program ISP. For instance, the sound state correction program SMP corrects sampling data through the CPU 11 on the basis of the inter-item distance $L_{ITB}$ which changes according to the coordinate of the moving transparent item $IT_B$, and the sound processing program SDP outputs the effective sound SE, the strength of sound ST of which is changed according to the inter-item distance $L_{ITB}$ from the speaker 7 through the CPU 11. That is, the player searches the item $IT_B$ with the assistance of the effective sound SE made from the moving transparent item $IT_B$.

The above-mentioned method of correcting the state of the effective sound SE refers to the correction of the strength of the effective sound SE(dB: decibel). But, all is not this method as long as the style when outputting the effective sound SE (output style) is changed, so that the player can search the transparent item $IT_B$. For instance, frequency of the effective sound SE may be corrected, or the effective sound SE may be set as successive pulse sound and its pulse width may be corrected according to the inter-item distance $L_{ITB}$. In addition to the correction of characteristic of output of sound, such as the strength of sound ST and the frequency of sound, furthermore, a plurality of kinds of voice data for guiding positions of the items (message data, such as "far" or "near") may be prepared in advance, and predetermined voice data is selected from a plurality of the kinds of the voice data according to the inter-item distance $L_{ITB}$ and may be outputted as sound.

Besides, any effective sound SE is available if a person can hear this sound. But, the effective sound according to a kind of the game or a scene, voice and BGM (background music) such as melody, are preferable in order not to spoil a fun of the game.

When the player instructs to obtain the item by operating the input device 4 in the above-mentioned way in such a state that the character CC approaches the appearance position $P_B$ of the transparent item $IT_B$, and the computed inter-item distance $L_{ITB}$ becomes a predetermined value or lower, the item $IT_B$ is removed from the world coordinate.

The inter-item distance computing program DCP sets the inter-item distance $L_{ITB}$ of the removed item $IT_B$ computed through the CPU 11 as NULL, concerning the removed item. Then, the item processing program ISP outputs through the CPU 11 a stop instruction of sound control. Receiving this instruction, the sound producing program SGP stops outputting sample data to the sound processing circuit 15 for executing the sound processing program SDP through the CPU 11, and the output of the effective sound SE is stopped. That is, the player perceives acquisition of the transparent item $IT_B$ by the character CC when stopping the output of the specified effective sound SE.

When the item processing program ISP judges that the inter-item distance $L_{ITB}$ is a predetermined value or lower through the CPU 11, this program executes the processing of obtaining the transparent item $IT_B$ with respect to the character CC, and writes predetermined data for showing acquisition of the transparent item $IT_B$ on the basis of the item data $ID_B$ in the character data CD (FIG. 3) which is stored in the data area of the RAM 13 of FIG. 2 for the corresponding character CC.

In the subsequent game, the player brings the game to advantageous development or gets the special favor in the game according to the obtained transparent item $IT_B$, so that the game proceeding is brought to a good condition.

According to the game software CGP in the invention, the computer is controlled to change the style of output of specific effective sound SE corresponding to the transparent item $IT_B$ in accordance with the distance between the character CC and the transparent item $IT_B$, as already mentioned. Therefore, sound may be essential element on the proceeding of the game when obtaining the item, and the player can enjoy the game concerning the acquisition of the item with hearing sense in addition to visual sense, thereby. Then, the realism of the game increases, thereby increasing the fun of the game.

In the above-mentioned embodiment, the state of the effective sound SE is corrected according to the inter-item distance $L_{ITB}$, but may be corrected according to a positional relation in the game space between the character CC and the item $IT_B$. When an obstacle which interrupts the effective sound SE is located between the character CC and the item $IT_B$ in the game space, for instance, the strength of sound ST of the effective sound SE may be corrected so as to be smaller by the obstacle. By doing so, the effective sound SE changes according to the contents represented on an image, the realism of the game can further increase, thereby further increasing the fun of the game.

In the above-mentioned embodiment, acoustic system of the effective sound SE is monaural sound system, but may be stereo sound system. For instance, a coordinate system as if the player himself or herself was in the game space may be set, and the image of the game space seen from the visual point of the player may be displayed on the display 3. The sound state correction program SMP corrects both sampling data corresponding to both right and left speakers 7 according to the distance between the visual point of the player and the appearance position of the transparent item $IT_B$ and the direction of the appearance position of the transparent item $IT_B$ seen from the visual point of the player, and the effective sound SE corresponding to both sampling data is respectively outputted to both right and left speakers 7. Then, the realism of the game can further increase, thereby further increasing the fun of the game.

Besides, the above-mentioned embodiment refers to a 2DCG (game on the basis of two-dimensional computer graphic). But, the invention can be also applied to a 3DCG (game on the basis of three-dimensional computer graphic) by computing the inter-item distance $L_{ITB}$ according to the three-dimensional position relation between the appearance position of the transparent item $IT_B$ and the character CC.

Besides, the invention is explained as game software in the above-mentioned embodiment. But, the present invention can be also of course applied to a game machine, for instance, having software comprised of various kinds of programs IPP, ANP, . . . in the game software CGP and a hardware for working the software, in addition to the game software CGP. And, the invention can be actualized as a game which does not depend on visual sensation since the game according to the invention proceeds with the assistance of sound. Therefore, the game having no picturing process is also possible in an another embodiment of the invention.

Furthermore, the portable game machine 1 of FIG. 1 is shown as a game machine in the above-mentioned embodiment. But, all is not this one. The game machine of course includes a so-called arcade game machine which is a game dedicated machine as long as it has a structure similar to the portable game machine 1. Furthermore, the present invention can be also applied to a cellular phone or a personal computer as a game machine.

The present invention has been explained on the basis of the example embodiments discussed. Although some variations have been mentioned, the embodiments which are described in the specification are illustrative and not limiting. The scope of the invention is designated by the accompanying claims and is not restricted by the descriptions of the specific embodiments. Accordingly, all the transformations and changes within the scope of the claims are to be construed as included in the scope of the present invention.

What is claimed is:

1. Game software being embodied in a computer readable medium for instructing a computer to execute the following processes, comprising:

a process for producing a virtual game space, wherein an operation character can move by instruction of a controller connected with said computer;

a process for setting a position for obtaining an invisible item which can be obtained by said operation character in said virtual game space;

a process for computing item distance; in said virtual game space between said operation character and said invisible item set at said position for obtaining;

a process for producing predetermined sound according to the distance computed by said process for computing item distance, and outputting the predetermined sound from sound output means connected with said computer;

a process for removing said invisible item from said position for obtaining when being instructed to obtain said item through said controller in such a state that said distance computed with said process for computing item distance becomes a predetermined value or lower;

a process for stopping output of said predetermined sound from said sound output means when instructed to obtain said item through said controller; and a process for obtaining the invisible item when said distance computed by said process for computing item distance becomes said predetermined value or lower.

2. The game software according to claim 1, wherein said process for producing predetermined sound changes a style of outputting sound outputted from said sound output means according to said distance computed by said process for computing item distance.

3. The game software according to claim 1, wherein said process for setting a position for obtaining an invisible item controls said position for obtaining in said virtual game space.

4. A game machine, comprising:

means for producing a virtual game space, wherein an operation character can move by instruction of a controller connected with said game machine;

means for setting a position for obtaining an invisible item which can be obtained by said operation character in said virtual game space;

means for computing item distance, in said virtual game space between said operation character and said invisible item set at said position for obtaining;

means for producing a predetermined sound according to the distance computed by said means for computing item distance, and outputting the predetermined sound from sound output means connected with said game machine;

means for removing said invisible item from said position for obtaining when instructed to obtain said item through said controller in such a state that a distance computed with said means for computing item distance becomes a predetermined value or lower;

means for stopping output of said predetermined sound from said sound output means when instructed to obtain said item by said controller; and means for executing processing for obtaining the invisible item when said distance computed by said means for computing item distance becomes said predetermined value or lower.

* * * * *